United States Patent Office 2,829,910

Patented Apr. 8, 1958

2,829,910

SEALED CIRCUMFERENTIAL JOINT FOR FUEL TANKS

Gerald A. Miller, Northridge, Calif., assignor to Royal Jet, Inc., Alhambra, Calif., a corporation of California Application March 4, 1955, Serial No. 492,223

14 Claims. (Cl. 285—370)

This invention relates to a circumferential joint construction, and more particularly to a means and method for sealingly joining adjacent skin sections of a jettisonable fuel tank for aircraft.

Jettisonable fuel tanks for aircraft are frequently constructed in a plurality of components which may be stacked or nested together during shipment for the purpose of conserving shipping and storage space, the tanks then being assembled at their destination and as required for the military operation being carried out. It will be apparent that when the various skin section components of each jettisonable fuel tank are assembled together, some means must be provided to prevent leakage of fuel through the joints. The problem of constructing adequate sealed joints, and in a simple and inexpensive manner, has heretofore been a great problem to jettisonable fuel tank manufacturers. One important reason for the problem has been that the pressure which should be placed upon a seal to effect optimum sealing may be very different from the pressure which should be applied to the actual connector members in order to prevent their failure and breakage under the extreme vibratory and other stresses encountered when the tanks are carried beneath the wings of military aircraft.

To amplify upon the above it will be understood that when metallic joint components are screwed or otherwise secured together to form a joint it is desired that extreme tightness and high pressures be achieved in order that the joint will be as strong as possible and will be able to withstand the forces to which it may be subjected. In particular, it is desired that each bolt in the joint be tensioned, due to turning of the associated nut, until the tensile stress in the bolt is as great or greater than the greatest stress to which the bolt will be subjected during flight conditions. When such a tension is achieved and maintained, the bolt cannot fail by tension since in order to be tightened as indicated it must be capable of withstanding extreme tensile stresses, and it cannot fail by fatigue since fluctuations in the load will not affect the tensile forces in the bolt. However, it has been found that when such high stresses are applied in conventional joints, any O-ring or similar seal along the circular line of abutment between the skin components may be crushed and deformed to such an extent that its sealing usefulness is impaired. Accordingly, a practical means has long been sought for making the sealing pressure independent of the joint pressure, yet which is simple and economical and is internal instead of external so as not to create undesirable air drag. This is particularly true with relation to circumferential joints employing a plurality of arcuate spaced connector brackets, as distinguished from a continuous annular connector member.

In view of the above problems characteristic of circumferential joints for jettisonable fuel tanks, it is an object of the present invention to provide a circumferential joint in which the sealing pressure is independent of the joint pressure applied by the connector members.

Another object is to provide a simple and economical means and method for joining in endwise abutment the skin sections of a jettisonable wing tank for aircraft, and which employs only a relatively small number of arcuately spaced connector brackets yet is strong and provides a fuel-tight seal.

These and other objects and advantages of the invention will be more fully set forth in the following specification and claims considered in connection with the attached drawing to which they relate.

In the drawing:

Figure 1 is a longitudinal elevational view showing an assembled fuel tank the main circumferential joints of which are constructed in accordance with the present invention;

Figure 2 is an enlarged fragmentary longitudinal sectional view, on line 2—2 of Figure 1, of the joint between the center and tail sections of the tank illustrated in Figure 1, showing the joint before application of sealing pressure;

Figure 3 corresponds to Figure 2 but shows the positions of the parts after application of sealing pressure;

Figure 4 is a transverse fragmentary sectional view, on line 4—4 of Figure 1, illustrating the means for applying sealing pressure, but before application of such pressure; and Figure 5 is a view of the means shown in Figure 4, taken from station 5—5 in Figure 4.

Referring now to the drawing, and particularly to Figure 1, there is illustrated a jettisonable fuel tank for aircraft comprising a thin-walled aluminum skin having a nose section 10, center section 11 and tail section 12. Formed between the adjacent cylindrical end portions of center section 11 and each of the nose and tail sections 10 and 12 is a circumferential joint constructed in accordance with the present invention. The circumferential joints being identical, only the one between center section 11 and tail section 12 will be described, and with particular reference to Figures 2–5.

Stated generally, the circumferential joint of the invention comprises a plurality of connector brackets 14, an annular seal support member 15, an annular seal member 16, and seal pressure means 17 to compress seal member 16 against support member 15 in order to distort the edges of the seal member into sealing contact with skin sections 11 and 12.

The connector brackets 14 may take the form of generally wing-shaped metal members having channels 18 formed exteriorly at their central portions, the lower walls of the channels being spaced a substantial distance inwardly from the line of abutment 19 between the tank sections. The brackets 14 extend longitudinally of the tank and are mounted in arcuately spaced relationship, sufficient brackets being employed to withstand the stresses to which a circumferential joint is subjected in service. Opposite ends of each bracket 14 are secured to the respective skin sections 11 and 12 as by bolts 21, the heads 22 of the latter being countersunk into the skin sections and into the bracket ends. An O-ring 23 is provided in each bolt head 22 to prevent leakage of fuel after tightening of the associated nut 24. It will be evident that various types of brackets 14, and various numbers and types of bolts 21, may be employed as required by the particular fuel tank.

Seal support member 15 is formed of metal or other relatively rigid material, and comprises a general cylindrical body concentric with the tank axis and spaced inwardly a substantial distance from the abutment line 19. The cylindrical body curves outwardly at its ends to form radially extending cam flanges 26 the peripheral edges of which are also spaced inwardly from the skin sections 11 and 12. The support member extends through the channels 18 of all the brackets 14, and may be either seated on the brackets 14 or spaced therefrom as illustrated.

Seal member 16 is formed of rubber or other suitable elastomeric or resilient plastic material, and is shown in its natural or undeformed state in Figure 2, and in its deformed state in Figure 3. Referring first to Figure 2, the undeformed seal member 16 may be seen to comprise a body 30 of channel section, the base or web of the channel having an outer diameter just slightly less than the inner diameter of the abutted tank sections 11 and 12. The flanges of the channel body 30 extend generally toward the center of the tank and are integral with the beads 31 which seat on support member 15 a slight distance inwardly from its cam flanges 26. Provided on beads 31, and coming into loose contact with the skin sections, are a plurality of outwardly extending sharp edged sealing lips or edges 32.

The seal pressure means 17 comprises an annular strap or band 36, preferably formed of flexible metal, and which is initially mounted between and in abutment with the skin sections 11 and 12 and the base of seal channel portion 30 as shown in Figure 2. The ends of strap 36 are looped over at 37 (Figures 4 and 5) to fit around the end portions of a turnbuckle 38 having a nut portion 39. Turnbuckle 38 is external to the fuel tank, being provided in a generally rectangular slot 41 formed between skin sections 11 and 12 as shown in Figure 5. It is emphasized that the turnbuckle 38 is the only component of the sealing means which is external to the fuel tank, so that the wind resistance or drag created by the seal means is negligible. Mounted between the turnbuckle 38 and seal means 16 is a thin plate 42 adapted to prevent damage to the seal as the trunbuckle is operated.

According to the method of the invention, the seal ring 16 is first mounted in the seal support channel 15, and the seal pressure means 17 is mounted loosely therearound so that the parts have the form shown in Figure 2. The tank skin sections 11 and 12 are then placed in endwise abutment by inserting them over lips 32 and band 36 as illustrated. Thereafter, the brackets 14 are mounted in position through use of bolts 21 and nuts 24 and prior to the assembly of nose section 10 with the center section 11 so that an operator may get inside the tank to tighten the nuts. It is pointed out that the tightening of the nuts 24 is to a torque determined solely by the strength requirements of the joint and the desired tensile stresses on the bolts 21, being entirely independent of the necessity of sealing the line of abutment 19.

It is then merely necessary for an operator outside the tank to turn the turnbuckle nut 39 and draw the looped ends 37 of band 36 together to decrease the diameter thereof. The channel portion 30 of seal means 16 is thus flattened against seal support member 15 to the position shown in Figure 3. The flanges of the channel portion 30 then tend to spread outwardly so as to force beads 31 against cam flanges 26 of the seal support. As the beads 31 press against cam flanges 26, the sealing lips 32 are forced radially outwardly against the respective skin sections 11 and 12 (Figure 3) and provide effective fluid tight seals preventing any leakage into the region of abutment line 19. It is pointed out that the outer ones of lips 32 curl radially outwardly between cam flanges 26 and the associated skin sections, and that this outward curling is desirable in that any fluid pressure acting against these lips will operate to increase the effectiveness of the seal.

In the described manner, therefore, the sealing pressure between lips 32 and skin sections 11 and 12 is determined by the seal pressure means and is completely independent of bolts 21 and nuts 24 as desired. The seal pressure may therefore be designed for the most effective sealing, and the bolt tensions for the most effective and strongest joint, without danger of undesirable interaction.

While the particular method and apparatus herein shown and disclosed in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:

1. A sealed circumferential joint between the abutted cylindrical end portions of jettisonable fuel tank skin sections, which comprises a plurality of longitudinally extending arcuately spaced connector brackets secured between said end portions and internally of said tank, said brackets having transverse outer channels therein radially inwardly of the line of abutment between said end portions, a cylindrical seal support ring mounted in said channels and having radially outwardly extending cam flanges, an elastomeric seal element mounted radially outwardly of said support ring between said flanges, said seal element having an inner groove at its center portion and radially outwardly extending lips at its edge portions, a flexible band mounted between said seal center portion and said line of abutment between said skin section end portions, and means to reduce the diameter of said band to force said seal center portion against said seal support ring and effect camming distortion of said seal element to force said lips against the respective skin sections.

2. An internal coupling for joining thin-walled tubular tank sections together with the parts of the coupling substantially confined to the interior of the tank, said coupling comprising circumferential by spaced U-shaped connectors inside said tank holding said sections in abutting relation, an outwardly opening channeled band encircling said connectors, an outwardly channeled ring of elastomer supported in said band and substantially filling the same, and means for compressing one annular portion of said ring of elastomer against the bottom and side walls of said channeled band thereby forcing a ring of elastomer to either side thereof radially outwardly into fluid-tight engagement with the interior walls of said tank sections.

3. An internal coupling as defined in claim 2 wherein said means for compressing said ring of elastomer includes manually adjustable means projecting outwardly through an opening in said thin-walled tank sections.

4. An internal coupling as defined in claim 2 including turnbuckle means for adjusting the tension in said means for compressing said ring of elastomer.

5. An internal coupling as defined in claim 4 wherein said turnbuckle means overlies said ring of elastomer and is accessible for adjustment from a point external to the tank sections and in an area between the lateral sealing edges of said elastomer ring.

6. In an internal coupling for jettisonable fuel tank skin sections, an elastomeric sealing ring having an axial web and pairs of radial flanges projecting inwardly and outwardly beyond the opposite surfaces and at the lateral edges of said web, said outwardly projecting flanges having thin-edged lips adapted to be pressed outwardly into fluid-tight sealing engagement with the inner surface edges of abutting fuel tank sections when said web is compressed radially inward against the bottom and side walls of a ring provided with an outwardly facing channel thereabout.

7. A fluid tight joint structure adapted to be expanded radially outwardly into sealing engagement with the interior surfaces of a pair of thin-walled shell members supported in end-to-end relation with said joint structure bridging said shell ends, said joint structure comprising a rigid ring shaped to form an outwardly facing channel thereabout, an annular elastomeric sealing member seated in said channel having an outwardly bulging central portion and outwardly projecting sealing lip means along its lateral edges positioned closely beside said channel side walls with their sealing edges adapted to lie closely adjacent the interior surfaces of said shell members, and contractible hoop means operable upon being contracted against the bulging central portion of said elastomeric member to compress the same into said channel thereby forcing said sealing lips into fluid tight sealing engagement with the interior surfaces of said shell walls.

8. A fluid tight joint structure as defined in claim 7 wherein said hoop means includes a turnbuckle operable when turned in one direction to expand said hoop and, when turned in the opposite direction, being effective to contract said hoop.

9. A fluid tight joint structure as defined in claim 8 wherein all portions of said hoop means are sealed from the interior of said shell members by said elastomeric ring when the latter is compressed and sealed against the interior surface of the shell members.

10. A sealing ring structure adapted for use interiorly of tubular members and operable for expansion outwardly into sealing engagement with the interior surface of such tubular members, said structure comprising a strong ring having an outwardly facing channel thereabout, an elastomeric ring seated therein having an outwardly bulging central portion bordered by radial lip means closely adjacent the side walls of said channel, and contractible hoop means embracing said bulging central portion operable when contracted to compress the bulge against the bottom of said channel and force said lips to expand outwardly from either side thereof thereby forming a seal with the juxtaposed interior surface of a surrounding tubular member.

11. A sealing ring structure as defined in claim 10 wherein said contractible hoop means includes means for contracting the same while in sealing position interiorly of a tubular member.

12. A sealing ring structure as defined in claim 10 wherein the lateral sealing portions of said elastomeric ring each have a plurality of continuous sealing lips facing radially outwardly to either side of said contractible hoop means.

13. A sealing ring structure as defined in claim 10 in combination with the interior abutting edges of two thin-walled shell sections of an aerodynamically contoured structure, and wherein said elastomeric ring is disposed to bridge and form a fluid-tight seal on the interior side of said abutting shell sections.

14. A sealing ring structure as defined in claim 13 including rigid tie members interconnecting said shell sections transversely of said sealing ring structure interiorly of said aerodynamically contoured structure.

References Cited in the file of this patent

UNITED STATES PATENTS

| | | |
|---|---|---|
| 1,607,943 | Carson | Nov. 23, 1926 |
| 1,788,845 | Reynolds | Jan. 13, 1931 |
| 2,209,235 | Nathan | July 23, 1940 |
| 2,214,177 | Raybould | Sept. 10, 1940 |
| 2,686,609 | Fletcher | Aug. 17, 1954 |

FOREIGN PATENTS

| | | |
|---|---|---|
| 321,563 | Italy | Oct. 9, 1934 |